United States Patent
Tamura

(10) Patent No.: US 8,228,423 B2
(45) Date of Patent: Jul. 24, 2012

(54) IMAGING APPARATUS AND METHOD FOR CONTROLLING FLASH EMISSION

(75) Inventor: Kazunori Tamura, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 321 days.

(21) Appl. No.: 12/569,346

(22) Filed: Sep. 29, 2009

(65) Prior Publication Data

US 2010/0079644 A1 Apr. 1, 2010

(30) Foreign Application Priority Data

Sep. 30, 2008 (JP) ................................. 2008-252237

(51) Int. Cl.
*H04N 5/222* (2006.01)
(52) U.S. Cl. ........................................ 348/371; 348/296
(58) Field of Classification Search ........................ None
See application file for complete search history.

(56) References Cited

U.S. PATENT DOCUMENTS

| | | | | |
|---|---|---|---|---|
| 2002/0140845 | A1* | 10/2002 | Yoshida et al. | 348/371 |
| 2003/0025822 | A1* | 2/2003 | Shimada | 348/370 |
| 2003/0128281 | A1* | 7/2003 | Nihei et al. | 348/222.1 |
| 2004/0080661 | A1* | 4/2004 | Afsenius et al. | 348/345 |
| 2005/0178950 | A1* | 8/2005 | Yoshida | 250/208.1 |
| 2005/0264688 | A1* | 12/2005 | Ouchi | 348/371 |
| 2006/0140615 | A1* | 6/2006 | Suzuki | 396/155 |
| 2008/0008361 | A1* | 1/2008 | Nozaki et al. | 382/118 |
| 2008/0074536 | A1* | 3/2008 | Tamura | 348/371 |
| 2008/0165265 | A1* | 7/2008 | Chiba et al. | 348/308 |
| 2008/0181597 | A1* | 7/2008 | Tamura | 396/164 |
| 2010/0026853 | A1* | 2/2010 | Mokhnatyuk | 348/240.2 |

FOREIGN PATENT DOCUMENTS

| | | |
|---|---|---|
| JP | 9-325388 A | 12/1997 |
| JP | 3639734 B2 | 4/2005 |
| JP | 2007-174217 A | 7/2007 |

OTHER PUBLICATIONS

"Exachangeable image file format for digital still cameras: EXIF version 2.2", Apr. 2002, published by Japan Electronics and Information Technology Industries Association.*
Japanese Office Action dated Mar. 13, 2012 issued in JP Application No. JP 2008-252237.

* cited by examiner

*Primary Examiner* — Lin Ye
*Assistant Examiner* — Dennis Hogue
(74) *Attorney, Agent, or Firm* — Birch, Stewart, Kolasch & Birch, LLP

(57) ABSTRACT

An imaging apparatus includes: flash driving means for driving a flash during a set preliminary emission period and a set main emission period; and an image sensor constituted by a plurality of photoelectric converting elements which are arranged in a matrix and capable of being accessed randomly. The charge accumulation initiation timing and the charge accumulation cessation timing of the photoelectric converting elements line are controlled line by line or pixel by pixel. The imaging apparatus forms images employing pixel signals output from the photoelectric converting elements, and determines main regions within the images. The preliminary emission period is set such that charge accumulation in photoelectric converting elements corresponding to pixels that constitute the main region is initiated prior to the preliminary emission period and ceased after the preliminary emission period. The flash driving means drives the flash during the set preliminary emission period.

22 Claims, 16 Drawing Sheets

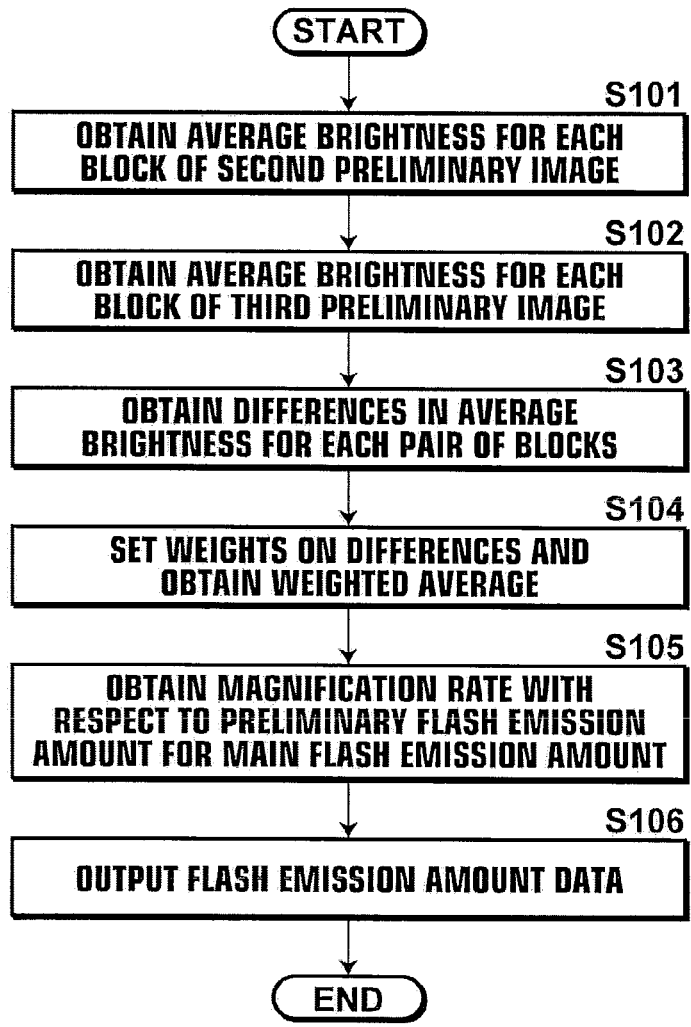

FIG.8
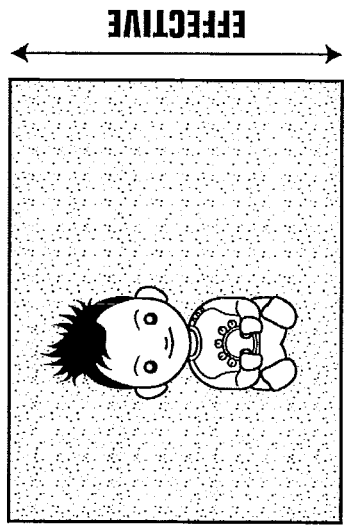
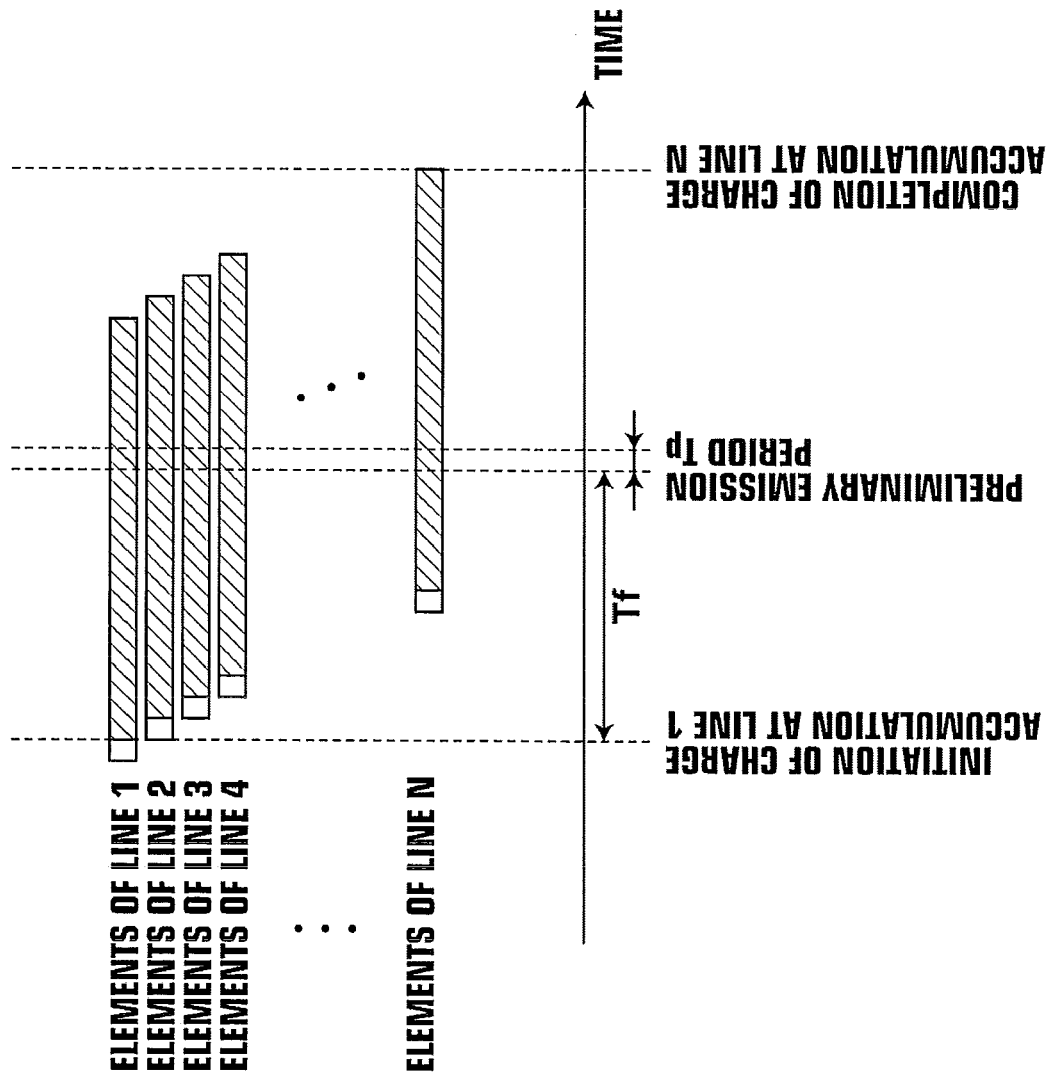

IMAGING APPARATUS AND METHOD FOR CONTROLLING FLASH EMISSION

BACKGROUND OF THE INVENTION

1. Field of the Invention

The present invention is related to an imaging apparatus equipped with a flash photography function, and a method for controlling flash. More specifically, the present invention is related to an imaging apparatus that obtains images with an imaging element which is capable of controlling an initiation timing and a cessation timing of charge accumulation in pixel units, and a method, and optimizes flash emission amounts utilizing the images, and a method for optimizing flash emission amounts.

2. Description of the Related Art

Recently, imaging elements which are provided in digital cameras and the like are transitioning form CCD image sensors to CMOS image sensors. CMOS image sensors can be manufactured by a process similar to that for manufacturing CMOS LSI's. Therefore, providing built in circuits other than image sensors into the same chip is facilitated, and CMOS image sensors are suited for use as so called "systems on chips". In addition, CMOS image sensors have advantages over CCD image sensors in that there is less influence by noise (smearing) during signal transfer, and the number of power sources can be reduced.

On the other hand, CMOS image sensors cannot output signals from all pixels simultaneously due to their structures, unlike CCD image sensors. Therefore, signal readout is performed line by line or pixel by pixel. At this time, charge accumulation is initiated pixels from the point in time that signals are output therefrom. Therefore, the charge accumulation initiation timing and the charge accumulation completion timing of each pixel differ according to the signal output timing thereof.

Meanwhile, there is a known method for controlling flash of digital cameras, in which flash is emitted prior to actual photography (hereinafter, referred to as "preliminary emission"), and an image obtained during the preliminary emission is utilized to optimize flash emission during actual photography (hereinafter, referred to as "main emission"). This method is effective when the imaging element of the digital camera is a CCD, but not suited for use in the case that the imaging element is a CMOS image sensor, in which the charge accumulation initiation/completion timings are different among pixels. For this reason, digital cameras which are equipped with CMOS image sensors are further provided with light adjusting sensors, and flash is controlled based on data obtained by the light adjusting sensors.

Japanese Patent No. 3639734 discloses a method, in which flash emission is controlled by utilizing images obtained by a CMOS image sensor. This document proposes a method in which the timing of preliminary emission is adjusted at the factory which manufactures digital cameras, such that preliminary emission is performed during a period in which pixels within a specific block are accumulating charges. Then, the signals which are read out from the specific block are employed to control main emission.

The method disclosed in Japanese Patent No. 3639734 is that which reads out signals from the specific block at the preliminary emission timing, as described in paragraphs 0028 through 0030. In this method, it is necessary to control readout operations depending on whether preliminary emission is performed. However, there is a possibility that frequent switching of control methods will lead to problems such as operating errors, which is not preferable. In addition, preliminary emission and optimization of actual flash emission amounts are performed after a shutter release button is depressed, and therefore high speed processing is required. Therefore, complex processes that accompany frequent switching of control methods is not preferable from the viewpoint of processing time as well.

SUMMARY OF THE INVENTION

The present invention has been developed in view of the foregoing circumstances. It is an object of the present invention to provide a method for optimizing the amount of flash emission without complex readout control even in cases that shutter speed is high (that is, exposure time is short), as a method for controlling flash emission in an imaging apparatus equipped with a CMOS sensor.

An imaging apparatus of the present invention comprises:

an image sensor constituted by a plurality of photoelectric converting elements which are arranged in a matrix and capable of being accessed randomly;

control means for controlling the charge accumulation initiation timing and the charge accumulation cessation timing of the photoelectric converting elements line by line or pixel by pixel;

image forming means for forming images employing pixel signals which are output from the photoelectric converting elements;

main region determining means for determining portions of the images which are formed by the image forming means as main regions;

flash driving means for driving a flash during a set preliminary emission period and a set main emission period; and period setting means for setting the preliminary emission period such that charge accumulation is initiated prior to the preliminary emission period and charge accumulation is ceased after the preliminary emission period in the photoelectric converting elements corresponding to pixels that constitute the determined main portions.

A method of the present invention is a method for controlling flash emission of an imaging apparatus that has a flash photography function, comprising the steps of:

controlling the charge accumulation initiation timing and the charge accumulation cessation timing of photoelectric converting elements of an image sensor constituted by a plurality of photoelectric converting elements which are arranged in a matrix and capable of being accessed randomly line by line or pixel by pixel;

forming images employing pixel signals which are output from the photoelectric converting elements;

determining portions of the formed images as main regions;

setting a preliminary emission period such that charge accumulation is initiated prior to the preliminary emission period and charge accumulation is ceased after the preliminary emission period in the photoelectric converting elements corresponding to pixels that constitute the determined main portions; and driving a flash during the set preliminary emission period.

In imaging elements such as CMOS image sensors, there are lines or pixels that cannot receive light reflected from subjects during preliminary emission, when the duration from charge accumulation initiation to charge accumulation cessation is short, that is, when the shutter speed is high. In this respect, in the imaging apparatus and the method for controlling flash of the present invention, the photoelectric converting elements corresponding to the main region receive light reflected from subjects during preliminary emission.

Therefore, images (preliminary images) suited for calculating flash emission amounts to be employed during main emission can be obtained even in cases that the shutter speed is high, and flash emission amounts to be employed during main emission can be set to appropriate values.

A configuration may be adopted, wherein:

the main region determining means detects predetermined patterns within the images formed by the image forming means, and determines regions in which the predetermined patterns are present as the main regions. In this case, it is preferable for the predetermined patterns to be images of faces or reference patterns which are utilized to detect movement of subjects.

A configuration may be adopted, wherein:

the main region determining means divides the images formed by the image forming means into a plurality of blocks, calculates distances from each block to subjects within the images, and determines regions constituted by at least one block having a distance to the subjects less than or equal to a predetermined threshold value as the main regions.

A configuration may be adopted, wherein:

the main region determining means divides the images formed by the image forming means into a plurality of blocks, calculates the brightness of subjects within each block, and determines regions constituted by at least one block having a subject brightness less than or equal to a predetermined threshold value as the main regions.

A configuration may be adopted, wherein:

the main region determining means receives input of region setting operations by a user within the images formed by the image forming means, and determines regions set by the region setting operations as the main regions.

It is preferable for the imaging apparatus to further comprise:

display control means for outputting the images formed by the image forming means and markers that indicate the main regions determined by the main region determining means to a predetermined screen. In this case, users can confirm the main regions on a monitor.

It is preferable for a configuration to be adopted, wherein:

the period setting means resets the preliminary emission period such that a period which is shifted for an amount of time corresponding to a predetermined threshold value from a reference period becomes the preliminary emission period, in the case that the amount of temporal shift between the preliminary emission period, which has been set based on the main region, and the reference period exceeds the predetermined threshold value. Alternatively, the period setting means may reset the preliminary emission period such that a reference period becomes the preliminary emission period, in such cases. Thereby, problems caused by set preliminary emission periods being greatly shifted from standard preliminary emission periods can be resolved.

It is preferable for a configuration to be adopted, wherein:

the main region determining means operates selectively based on an operating mode set in the imaging apparatus. That is, it is preferable to switch whether main regions are to be determined, and the method by which determinations are made according to operating modes.

It is preferable for the imaging apparatus of the present invention to further comprise:

means for recording the images formed by the image forming means into a predetermined recording medium, and for recording data that specifies the preliminary emission period as data attached to the images. In this case, users can read out the data from the recording medium along with the images, and confirm the data. In addition, in cases that image files are transferred to a personal computer and image processes are administered thereon, the data can be utilized in the image processes.

BRIEF DESCRIPTION OF THE DRAWINGS

FIG. 6 is a flow chart that illustrates the steps of a process performed by a flash emission amount calculating section.

FIG. 7 is a diagram that illustrates an example of weighting coefficients assigned to blocks of an image.

FIG. 8 is a diagram that illustrates the relationship between emission periods of a flash and the operation of a CMOS image sensor when third preliminary images are obtained with a normal shutter speed.

DESCRIPTION OF THE PREFERRED EMBODIMENTS

Hereinafter, an SLR digital camera equipped with a flash photography function and a method for controlling the flash of the digital camera will be described as embodiments of the imaging apparatus and the control method of the present invention.

First Embodiment

Figure 1:
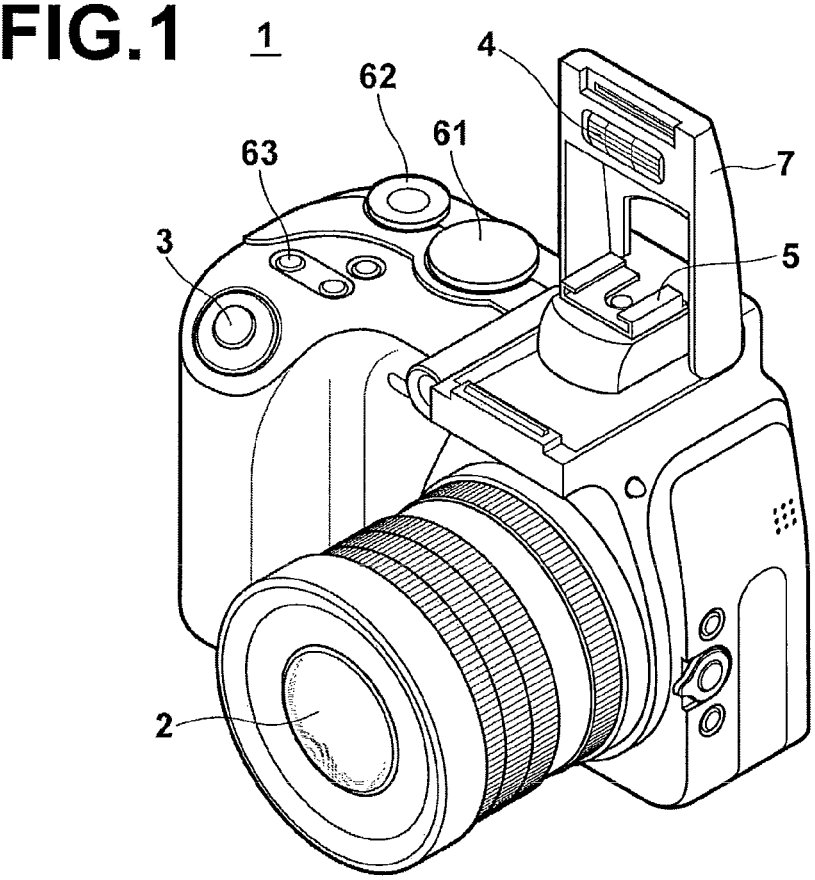
FIG. 1 is a perspective view that illustrates the outer appearance of a digital camera.

FIG. 1 is a perspective view that illustrates the outer appearance of a digital camera 1. As illustrated in FIG. 1, an imaging lens 2 is provided on the front surface of the digital camera 1. A shutter release button 3; a flash 4; a hot shoe 5, which is a mounting port for peripheral equipment; and setting/operating buttons 6 that include a mode dial 61 for performing various setting operations; a command dial 62; and a flash button 63 are provided on the upper surface of the digital camera 1.

The shutter release button 3 is of a structure that can command two types of operations by being depressed in two steps. For example, during a photography operation that utilizes an AE (Automatic Exposure) function and an AF (Automatic Focus) function, the digital camera 1 sets an optimal exposure and an optimal focal point when the shutter release button 3 is depressed lightly (also referred as "half depression"). If the shutter release button 3 is depressed strongly (also referred to as "full depression") in this state, the digital camera initiates exposure with set conditions, then records image data obtained by the exposure corresponding to a single frame into a memory card.

The flash 4 is housed in a flash housing section 7. The flash performs emission operations accompanying second step depressions (full depressions) of the shutter release button 3. The flash housing section 7 opens upward from the camera automatically or by manual operation. FIG. 1 illustrates the flash housing section 7 in an open state.

The emission operation of the flash is determined by photography modes and flash modes which are set by a user. The photography modes include: an AUTO mode, in which all settings involved with photography operations are automatically set by the digital camera 1; a manual mode, in which all settings involved with photography operations are manually set by the user; a program auto mode; a shutter prioritizing auto mode; an aperture prioritizing auto mode; a preliminary reduced mode; a natural photo mode; and modes set for photography scenes, such as portraits, scenery, and night views. The photography mode can be set by operating the mode dial 61. The flash modes include: an automatic flash mode, in which whether it is necessary to emit flash is judged from the brightness of the surroundings; and a forced emission mode, in which flash is emitted regardless of the brightness of the surroundings. The flash mode can be set by depressing the flash button 63, and performing operations on a setting screen which is displayed on a monitor to be described later.

An external flash may be mounted onto the hot shoe 5 of the digital camera 1 in a state in which the flash housing section 7 is closed. The external flash is mechanically and electrically connected to the digital camera by being mounted onto the hot shoe 5. Thereby, the external flash performs emission operations accompanying depressions of the shutter release button 3 according to set operating modes, in the same manner as the built in flash 4. The present invention is applicable to cases in which an imaging apparatus utilizes an external flash as well as cases in which an imaging apparatus utilizes a built in flash.

Figure 2:
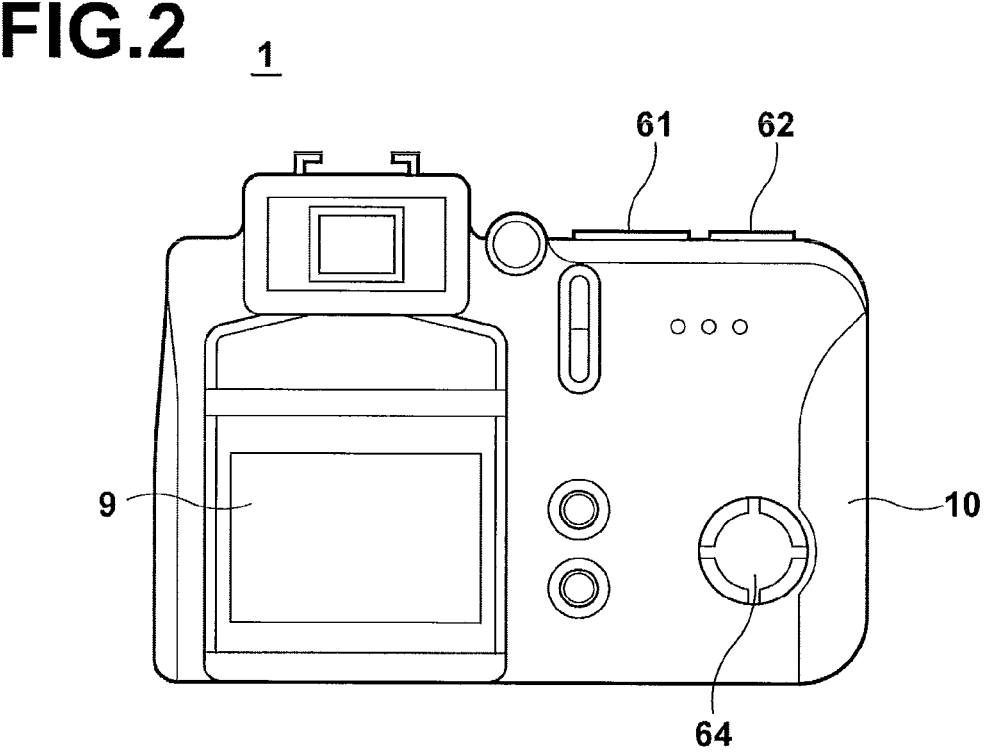
FIG. 2 is a rear view of the digital camera of FIG. 1.

FIG. 2 is a rear view of the digital camera 1. As illustrated in FIG. 2, an LCD (Liquid Crystal Display) monitor 9, a cruciform key 64 which is employed to select options during setting operations, and various setting operation buttons, such as a zoom setting button, are provided on the rear surface of the digital camera 1. A slot cover 10 provided on the side surface of the digital camera 1 is openable and closable, and a memory card slot is provided within the slot cover 10. Images which are photographed by the digital camera 1 are recorded into a recording medium such as an xD picture card loaded in the memory card slot.

Figure 3:
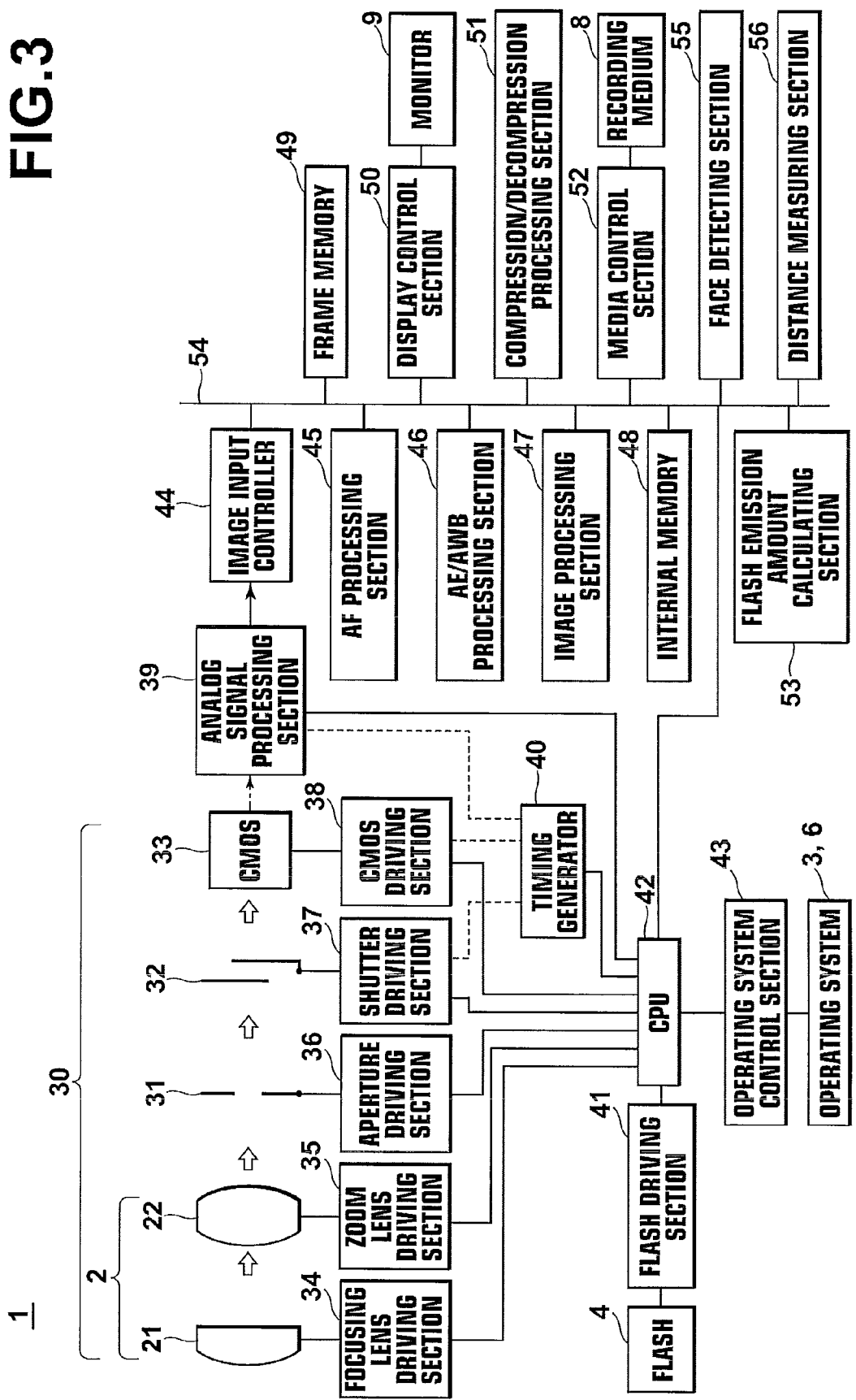
FIG. 3 is a diagram that illustrates the inner structure of the digital camera of FIG. 1.

FIG. 3 is a diagram that illustrates the inner structure of the digital camera 1. As illustrated in FIG. 3, the digital camera 1 is equipped with a CPU 42 and an internal memory 48, in which various control programs for controlling photography operations and various setting values are stored. In addition, the digital camera 1 is equipped with an operating system control section 43, into which data is input from an operating system including the shutter release button 3 and the various setting/operating buttons 6. The CPU 42 sends and receives signals with the components of the digital camera 1 either directly or via a system bus 54. The CPU 42 controls updates of set values stored in the internal memory 48 according to operation data input from the operating system control section 43 and control programs stored in the internal memory 48. The CPU 42 also functions to control the operations of various components of the digital camera 1 to be described hereinafter.

The digital camera 1 is equipped with: imaging lenses 2; an aperture 31; a shutter 32; a CMOS image sensor 33; and drive sections for driving and controlling these components, as an imaging system 30. The imaging lenses 2 are constituted by a focusing lens 21 and a zoom lens 22. The focusing lens 21 and the zoom lens 22 are driven by a focus lens driving section 34 and a zoom lens driving section 35, which are respectively constituted by a motor and a motor driver, so as to be movable in the direction of the optical axes thereof. The focusing lens driving section 34 drives the focusing lens 21 based on focus driving amount data output from an AF processing section 45 to be described later. The zoom lens driving section 35 controls the driving of the zoom lens 22 based on operation amount data of a zoom lever.

The aperture 31 is driven by an aperture driving section 36 constituted by a motor and a motor driver. The aperture driving section 36 adjusts how much the aperture 31 is opened based on aperture value data output from an AE/AWB processing section 46 to be described later.

The shutter 32 is a mechanical shutter, and is driven by a shutter driving section 37 constituted by a motor and a motor driver. The shutter driving section 37 controls the opening and closing of the shutter 32 according to a signal which is generated when the shutter release button 3 is depressed, and also according to shutter speed data output from the AE/AWB processing section 46.

The CMOS image sensor 33, which is an imaging element, is provided toward the rear of the optical system described above. The CMOS image sensor 33 has a light receiving surface, in which a plurality of photoelectric converting elements are arranged in a matrix. A microlens array for focusing light onto each pixel, and a color filter array, in which R, G, and B filters are arranged in a regular manner, are provided in front of the photoelectric converting surface. Light which has passed through the optical system is focused onto the light receiving surface, and photoelectrically converted such that charges are accumulated in each photoelectric converting element.

The accumulated charges are amplified by an amplifying element which is provided behind each photoelectric converting element. The charges are output as analog image signals one line at a time, synchronized with vertical transfer clock signals and horizontal transfer clock signals provided by a CMOS driving section 38.

In the following description, each element constituted by a photoelectric converting element and an amplifying element corresponding to a single pixel will be referred to as a unit element. The topmost line of the light receiving surface will be referred to as line 1, and subsequent lines will be referred to as line 2, line 3, . . . line N (N is the total number of lines).

Figure 4:
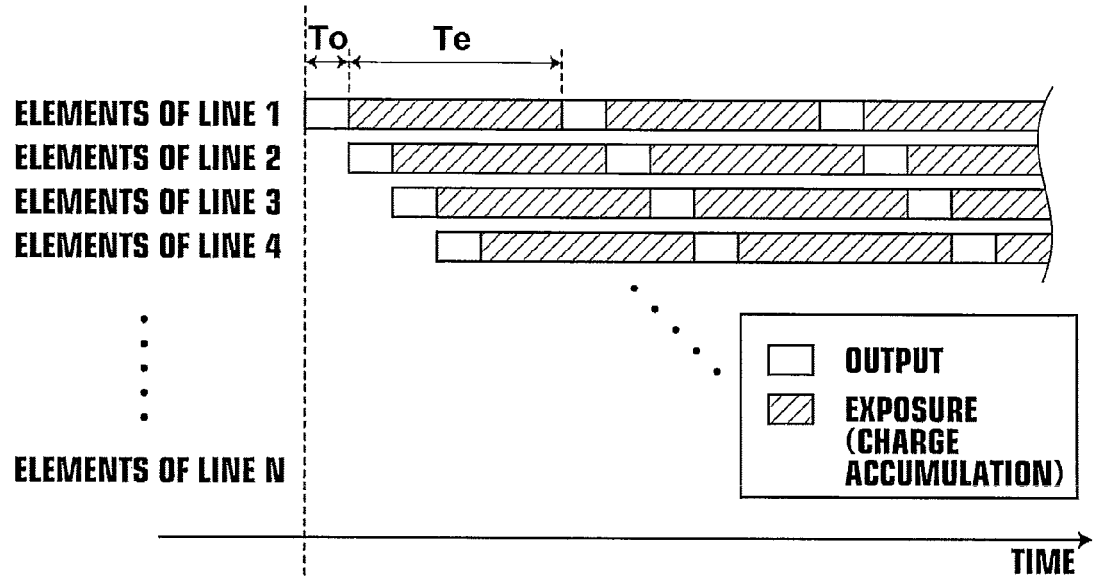
FIG. 4 is a chart that illustrates exposure operations and output operations of unit elements.

FIG. 4 is a chart that illustrates the operations of unit elements that constitute each line of the CMOS image sensor 33. The horizontal axis in the chart of FIG. 4 represents time. As illustrated in FIG. 4, when charges which are accumulated in the unit elements are output in order from line 1 and the amount of time required to output charges for a single line is To, the time required to output a single frame becomes To·N.

In CCD's, which were conventionally used as imaging elements, all unit elements initiate a next exposure operation (accumulation of charges) simultaneously after output of a single frame is complete. In contrast, each unit element of a CMOS image sensor initiates accumulation of charges immediately after charges accumulated therein are output. For this reason, it is possible to control the timing at which each line or each unit element of a CMOS image sensor initiates accumulation of charges, by controlling the timing at which charges are output. If the output timings are controlled to read out signals in units of lines, the exposure periods of unit elements that constitute each line are shifted by an amount of time To, as illustrated in FIG. 4.

The amount of time To required to output charges is determined by the specifications (performance) of each device, and is stored in the internal memory 48. Meanwhile, the charge accumulation period, that is, an amount of exposure time Te, is controlled by electronic shutter drive signals which are output by the CMOS driving section 38. The CMOS driving section 38 determines the exposure time Te based on a shutter speed obtained by the AE/AWB processing section 46 or based on a shutter speed set by the setting/operation buttons 6. Clock control is exerted such that each unit element outputs charges when the exposure time Te elapses.

A description will be given with reference to FIG. 3. Analog signals which are output from the CMOS image sensor 33 are input into an analog signal processing section 39. The analog signal processing section 39 is constituted by: a correlated double sampling (CDS) circuit for removing noise from the analog image signals; an automatic gain controller (AGC) for adjusting the gain for the analog image signals; and an A/D converter (ADC) for converting the analog image signals to digital image data. The analog signals input into the analog signal processing section 39 are converted into CCD-RAW data having RGB density values for each pixel by the above circuits.

A timing generator 40 generates timing signals. The timing signals are input to the shutter driving section 37, the CMOS driving section 38, and the analog signal processing section 39, to synchronize the operation of the shutter release button 3, the opening and closing of the shutter 32, readout of charges from each line or each pixel of the CMOS image sensor 33, and the processing by the analog signal processing section 39.

An image input controller 44 organizes the digital data input from the analog signal processing section 39 into frame units, and writes the digital data in a frame memory 49. That is, in the present embodiment, the analog signal processing section 39 and the image input controller 44 function as an image forming means.

The frame memory 49 is a memory used as workspace for various types of digital image processes (signal processing) on the image data, which will be described later, and comprises an SDRAM (Synchronous Dynamic Random Access Memory) that carries out data transfer in synchronization with a bus clock signal of a predetermined period, for example.

A display control section 50 functions to display the image data stored in the frame memory 49 as a through the lens image on the monitor 9, and to display image data stored in a recording medium 8 in a playback mode. Note that the through the lens image is continuously obtained by the CMOS image sensor 33 at predetermined intervals when a photography mode is selected.

The AF processing section 45 and the AE/AWB processing section 46 determine photography conditions based on a first preliminary image. The first preliminary image is obtained by the CMOS image sensor 33 when the CPU 42 detects a half depression operation of the shutter release button 3, and is an image which is stored in the frame memory 49 via the analog signal processing section 39 and the image input controller 44.

The AF processing section 45 detects a focusing position based on the first preliminary image, and outputs focusing drive amount data (AF processing). A passive method, in which a characteristic that a focus evaluation value (contrast value) of images increases in a focused state is utilized, may be applied to detect the focusing position.

The AE/AWB processing section 46 measures the luminance of subjects based on the first preliminary image, and determines exposure conditions such as an ISO sensitivity, an aperture value, an shutter speed and the like, based on the luminance. The AE/AWB processing section 46 then outputs ISO sensitivity data, aperture value data, and shutter speed data as exposure setting values (AE processing). At the same time, the AE/AWB processing section 46 automatically adjusts white balance during photography (AWB processing). Note that the exposure and white balance may be set by manual operations input by a photographer, if the photography mode is set to manual mode. In addition, even in the case that the exposure and white balance are set automatically, a photographer may input commands through the operating system to manually adjust the exposure and white balance.

An image processing section 47 administers image quality enhancement processes such as gradation correction, sharpness correction, and color correction on image data of a final image. The image processing section 47 also administers YC processes to convert the CCD-RAW data into YC data comprising Y data as a luminance signal, Cb data as a blue color difference signal, and Cr data as a red color difference signal. The final image is an image based on the image data stored in the frame memory 49 via the analog signal processing section 39 and the image input controller 44 after input of the analog image data from the CMOS image sensor 33, in response to a full depression of the shutter button 3. The maximum number of pixels of the final image is determined by the number of the pixels of the CCD 58. However, the number of pixels to be recorded can be changed by the user, by setting the image quality to fine or normal, for example. The number of pixels of the through the lens image and the preliminary image may be less than that of the final image, and may be ¹⁄₁₆ that of the final image, for example.

A compression/decompression section 51 carries out compression processes to a format such as JPEG on the image data, which has been subjected to the image enhancement processes and the like by the image processing section 47, and generates an image file. Accompanying information is added as tags to the image file, based on the Exif format. The compression/decompression section 51 also reads compressed images files from the recording medium 8 in the playback mode, and administers decompression processes thereon. Image data, on which the decompression processes have been administered, are displayed on the monitor 9.

A media control section 52 carries out image-file reading and writing from and to the recording medium 8.

A face detecting section 55 detects patterns that represent faces (hereinafter, referred to as "facial patterns") from within through the lens images obtained prior to operation of the shutter release button and from within preliminary images obtained after operation of the shutter release button. In detection from within through the lens images, a face which is detected first is set as a reference pattern, and movement of the face is detected by obtaining differences among subsequently detected facial patterns. Alternatively, a pattern of an entire person that includes the face which is detected first is set as a reference pattern, and movement of the person is detected.

A distance measuring section 56 divides images into a plurality of blocks, and obtains distances to subjects from each block. The calculation of distances is performed employing a plurality of preliminary images having different focusing positions which are obtained during the AF process. In these preliminary images, blocks which are in focus have the highest image contrast. Therefore, the distances to the subjects within these blocks can be obtained as distances to focusing positions.

The flash 4 is driven by the flash driving section 41 to emits light when the CPU 42 detects a full depression operation of the shutter release button 3 in a state that the photography mode or the flash mode is set to a mode in which flash is to be emitted. Flash emission is performed a total of two times, once for preliminary emission and once for main emission. Flash emission is controlled by the flash driving section 41, the CPU 42, and a flash emission amount calculating section 53.

The flash emission amount calculating section 53 determines the amount of flash to be emitted during main emission, based on a second preliminary image and a third preliminary image. The second preliminary image is obtained by the CMOS image sensor 33 prior to preliminary emission of flash when the CPU 42 detects a full depression operation of the shutter release button 3, and is an image represented by image data which is stored in the frame memory 49 via the analog signal processing section 39 and the image input controller 44. The third preliminary image is obtained by the CMOS image sensor 33 during the preliminary emission of flash, and is an image represented by image data which is stored in the frame memory 49.

Figure 5:
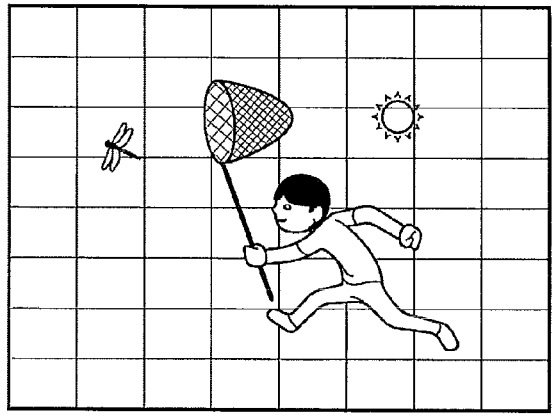
FIG. 5 illustrates an example in which an image is divided into 8×8 block regions.

In the present embodiment, the flash emission amount calculating section 53 determines the amount of flash to be emitted during main emission based on the brightness of the central portion of an image. The flash emission amount calculating section 53 reads out the second preliminary image from the frame memory 49, and divides the second preliminary image into a plurality of block regions. FIG. 5 illustrates an example in which an image is divided into 8×8 block regions.

FIG. 6 is a flow chart that illustrates the steps of a process performed by the flash emission amount calculating section 53. As illustrated in FIG. 6, the flash emission amount calculating section 53 obtains average brightness values for each block within a second preliminary image (step S101). Specifically, the second preliminary image, which is an RGB image, is converted to a YCC image, to obtain brightness values for each pixel. Then, the average brightness values of pixels in each block are calculated. Average brightness values are obtained for each block within a third preliminary image in the same manner (step S102). Then, differences among the average brightness values obtained in step S102 and the average brightness values obtained in step S101 are calculated (step S103).

Next, the flash emission amount calculating section 53 sets weights for the differences for each block which were calculated in step S103, and calculates a weighted average (step S104). Thereby, a reflected brightness E1 during preliminary emission is obtained. The weights are set higher for blocks arranged at positions closer to the center of the image, as illustrated in the example of FIG. 7. That is, the reflected brightnesses of subjects arranged at the center are caused to be more strongly reflected in the calculation results.

The flash emission amount calculating section 53 obtains a magnification rate M, which is the magnification rate of the flash emission amount during main emission with respect to that during the preliminary emission, according to Formula (1) below (step S105).

$$M=(E2-E3)/E1 \quad (1)$$

wherein E2 is a target brightness of an image to be obtained by actual photography, and E3 is the average brightness of the entire second preliminary image, which is obtained without emitting flash.

Then, data that represents the magnification rate M, or data that represents the flash emission amount to be utilized for main emission, calculated by multiplying the flash emission amount during preliminary emission by M, is output as flash emission amount data (step S106).

The flash emission amount data output from the flash emission amount calculating section 53 is provided to the flash driving section 41 via the CPU 42. The flash driving section 41 adjusts the bulb voltage and emission time of the flash 4 such that the flash emission amount during main emission becomes that indicated by the flash emission amount data, and drives the flash 4.

Note that various other methods for calculating the flash emission amount during main emission based on an image obtained without emitting flash and an image obtained during preliminary emission may be employed. For example, there is a known method for determining a flash emission amount by performing calculations with weighting placed on regions at which faces are detected, in digital cameras that have a function of detecting faces within images. The flash emission amount calculating section 53 may adopt such a known method to calculate flash emission amounts, and the process described above is merely an illustrative example.

Figure 9:
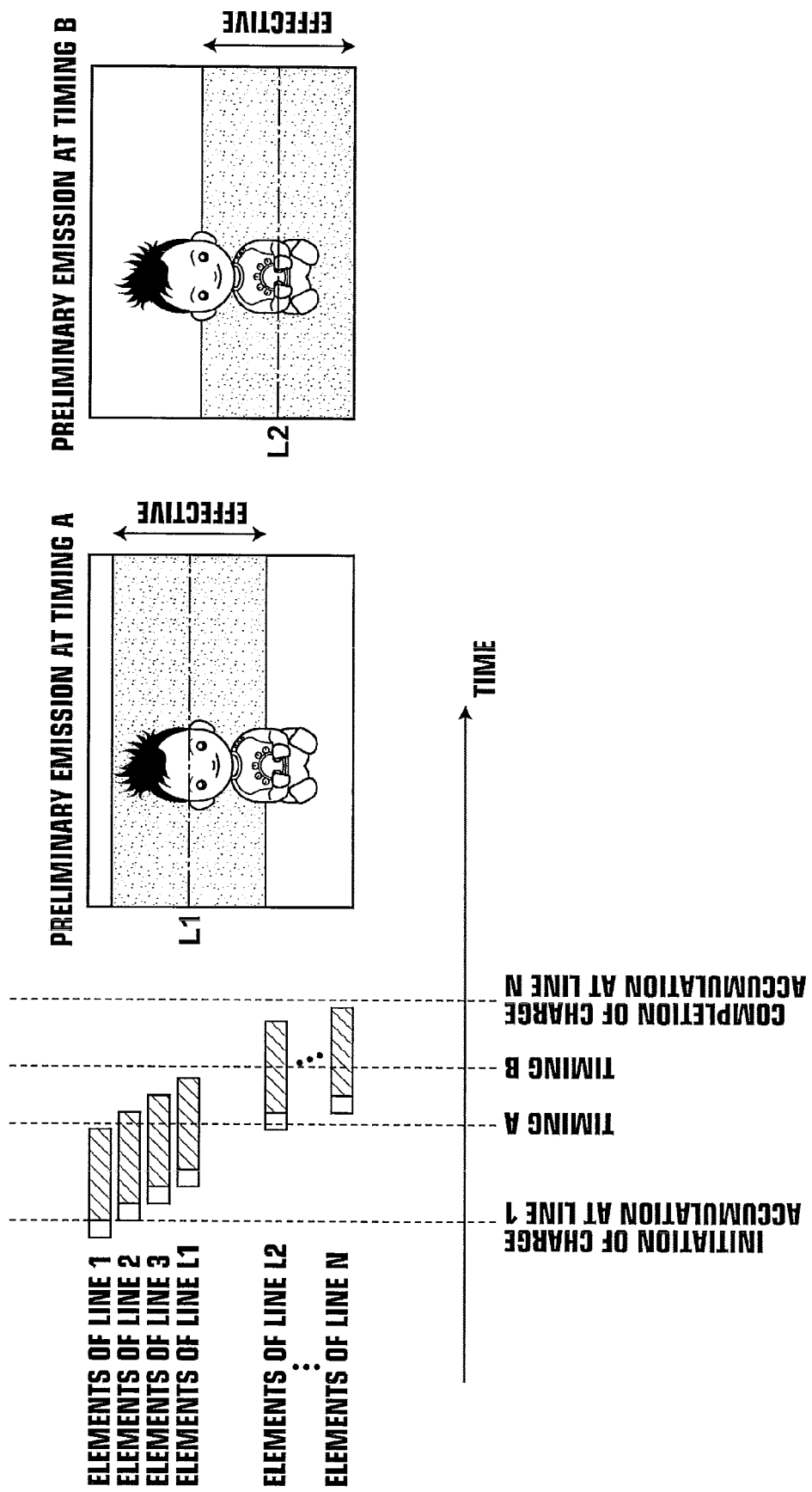
FIG. 9 is a diagram that illustrates the relationship between emission periods of a flash and the operation of a CMOS image sensor when third preliminary images are obtained with a high shutter speed.

Hereinafter, operations related to controlling the flash of the digital camera 1 will be described further. FIG. 8 and FIG. 9 are diagrams that illustrate relationships between emission periods of the flash 4 and the operation of the CMOS image sensor 33 when third preliminary images are obtained. FIG. 8 illustrates the relationship in the case that a normal (not high) shutter speed is set, and FIG. 9 illustrates the relationship in the case that a high shutter speed is set.

As illustrated in FIG. 8, the exposure time Te of the unit elements illustrated in FIG. 4 becomes sufficiently long compared to the output time To at a normal shutter speed setting. In this case, a comparatively long period during which all of the unit elements are accumulating charges is present. Accordingly, if preliminary emission is performed at a midpoint of a period beginning at a charge accumulation initiation time of line 1 and a charge accumulation completion time of line N, light reflected during the preliminary emission period is received by unit elements that constitute all lines of the CMOS image sensor 33. In other words, all of the unit elements that constitute the CMOS image sensor 33 initiate charge accumulation prior to the preliminary emission period and cease charge accumulation after the preliminary emission period. The third preliminary image is formed from pixel signals output from these unit elements.

On the other hand, when the shutter speed is high, that is, the exposure time Te is short, a period during which all of the unit elements are accumulating charges is not present, or extremely short, as illustrated in FIG. 9. For this reason, only unit pixels of a limited number of lines output effective pixel signals which are generated by receiving reflected light during the preliminary emission period. In addition, as illustrated in FIG. 9, the image ranges from which effective pixel signals can be obtained differ in the case that preliminary emission is initiated at a timing A, which is the approximate midpoint of a charge accumulation period of line L1 and the case that preliminary emission is initiated at a timing B, which is the approximate midpoint of a charge accumulation period of line L2.

In the example illustrated in FIG. 9, if preliminary emission is initiated at timing A, effective pixel signals can be obtained within a region that represents a face within the image. However, if preliminary emission is initiated at timing B, effective pixel signals cannot be obtained within a region that represents a face within the image. Therefore, in the present embodiment, the preliminary emission period is adjusted such that preliminary emission is initiated at timing A, by the steps to be described below.

Figure 10:
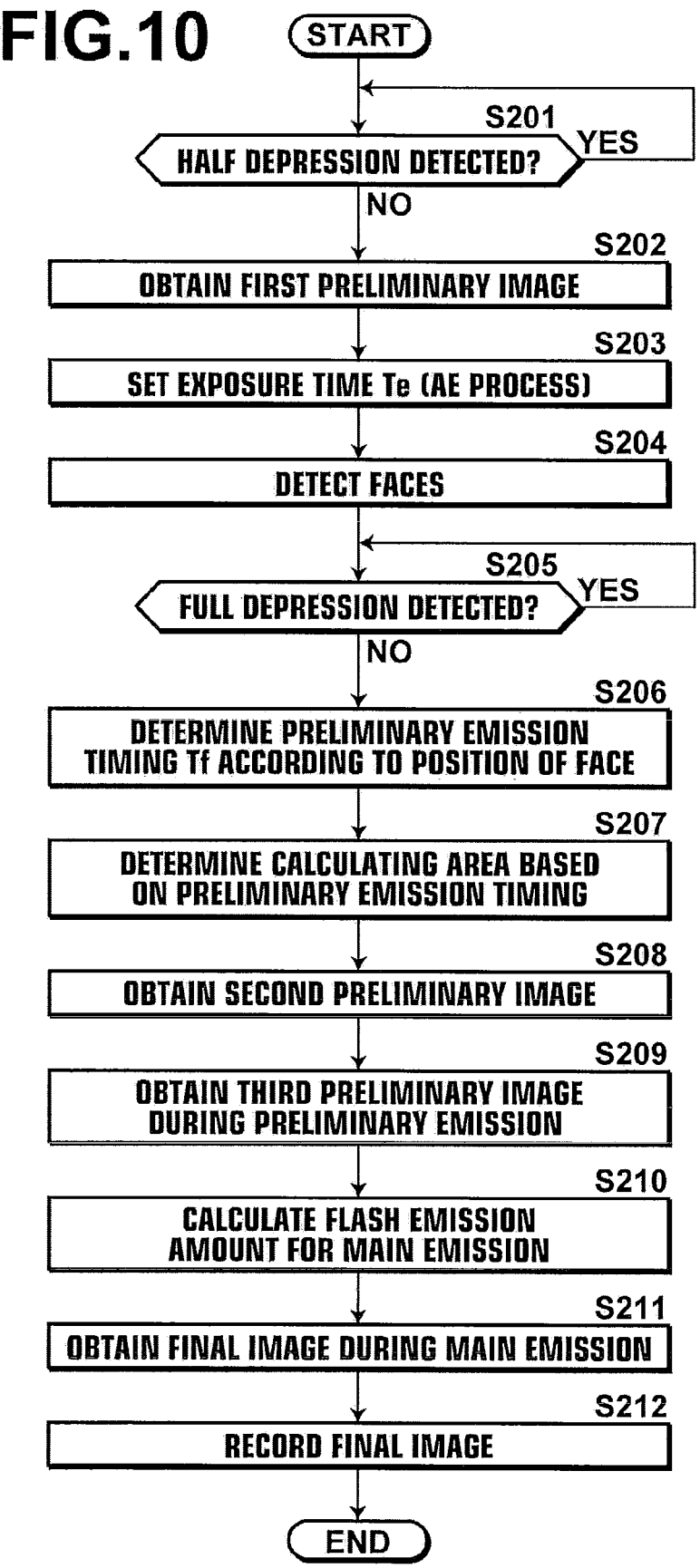
FIG. 10 is a flow chart that illustrates the operations of the digital camera of FIG. 1 related to determining a flash emission amount (first embodiment).

FIG. 10 is a flow chart that illustrates the operations of the digital camera 1 related to determining the flash emission amount to be employed during main emission. When a half depression operation of the shutter release button 3 is detected by the CPU 42 (step S201), a first preliminary image is obtained by commands issued by the CPU 42 and stored in the frame memory 49 (step S202). The first preliminary image is utilized by the AE/AWB processing 46 as described previously, and an exposure time Te is set by an AE process (step S203).

Figures 11, 12:
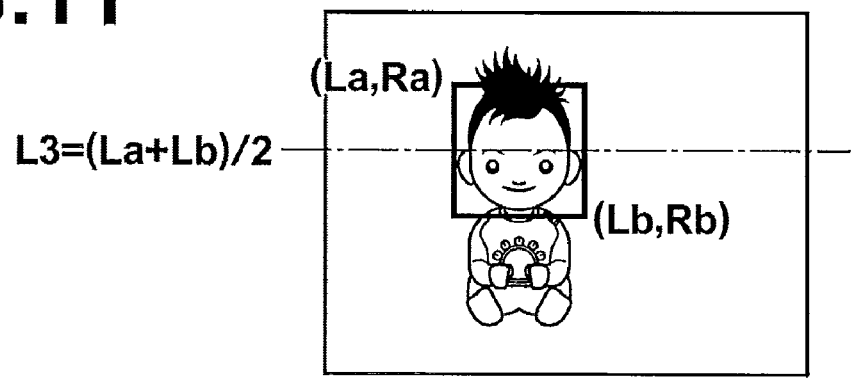
FIG. 11 is a diagram for explaining a method for determining a preliminary emission timing (first embodiment).
FIG. 12 is a diagram that illustrates an example of calculation parameters (weighting coefficients).

Meanwhile, the first preliminary image stored in the frame memory 49 is also read out by the face detecting section 55. The face detecting section 55 searches for facial patterns within the first preliminary image, and in the case that a facial pattern is detected, main region data that indicates a region in which the face pattern is present is output (step S204). That is, in the present embodiment, the face detecting section 55 functions as the main region determining means. In addition, line numbers and row numbers (La, Ra) and (Lb, Rb) that represent the opposing corners of a rectangular region that includes the facial pattern are output as data that specifies the rectangular region that includes the facial pattern, as illustrated in FIG. 11.

When the CPU 42 detects a full depression operation of the shutter release button 3 (step S205), the flash emission amount calculating section 53 determines the timing at which preliminary emission is initiated to match the position of the detected face (step S206). Here, the timing at which preliminary emission is initiated is represented by an amount of time Tf between initiation of charge accumulation by unit elements of line 1 and initiation of preliminary emission. Note that the preliminary emission time Tp is set in advance, and the preliminary emission completion timing is defined by an amount of time (Tf+Tp). The preliminary emission period is set in this manner.

The flash emission amount calculating section 53 obtains a line that includes the central pixel within the face pattern, based on the main region data output by the face detecting section 55. In the example illustrated in FIG. 11, the line number L3 that includes the central pixel within the facial pattern can be obtained by Formula (2).

$$L3=(La+Lb)/2 \qquad (2)$$

Thereafter, the amount of time between initiation of charge accumulation by unit elements of line 1 to the midpoint of a charge accumulation period of Line 3 is calculated, based on the set exposure time Te and the output time To stored in the internal memory 48. That is, a time from line L1 to the midpoint of the charge accumulation period of Line L3 is determined as the preliminary emission initiation timing. Then, the calculated time is stored as time Tf that represents the initiation timing of preliminary emission in the internal memory 48.

Further, the flash emission amount calculating section 53 determines the lines to be utilized in calculations based on the set exposure time Te, the output time To stored in the internal memory 48, the time Tf that represents the initiation timing of preliminary emission, and the preliminary emission time Tp (step S207).

For example, the range of lines to be utilized to calculate the flash emission amount is determined by Formula (3) below.

$$Lmin=(Tf+Tp-Te)/To+1, Lmax=Tf/To+1 \qquad (3)$$

wherein Lmin is the line having the smallest line number and Lmax is the line having the largest line number within the range of lines. Note that in the case that Lmin<1, Lmin is designated to be 1, and in the case that Lmax>N, Lmax is designated to be N. The line numbers that specify the determined range are stored in the internal memory 48.

After the calculation area is determined, a second preliminary image is obtained according to commands output by the CPU 42, and stored in the frame memory 49 (step S208). Further, preliminary emission is initiated by the flash driving section 41 at the timing indicated by the time Tf, and a third preliminary image obtained at this time is stored in the frame memory (step S209).

Next, the flash emission amount calculating section 53 reads out the second preliminary image and the third preliminary image from the frame memory 49, and extracts effective pixel signals, that is, pixel signals within the calculation area, from the preliminary images. Thereafter, the process of the flow chart of FIG. 6 is executed with respect to only the extracted pixel signals, to calculate the flash emission amount to be employed during main emission (step S210). However, in the process for obtaining the weighted average at step S104 of FIG. 6, adjusted weighting coefficients illustrated in FIG. 12 are employed instead of the weighting coefficients illustrated in FIG. 7. That is, it is preferable for the weighted average to be calculated with higher weighting at block group B2 that corresponds to the region indicated by the main region data, from among the block group B1 that corresponds to the effective pixel signals.

When the flash emission amount is determined, main emission is performed according to commands output from the CPU 42. and a final image obtained at this time is stored in the frame memory 49 (step S211). The final image stored in the frame memory 49 is recorded in the recording medium 8 via the media control section (step S212). The final image is compressed by the compression/decompression section 51 as necessary, and recorded as an image file of a predetermined format (an Exif file, for example).

In the present embodiment, the time Tf that represents the initiation timing of preliminary emission, line numbers Lmin and Lmax that specify the range to be employed in calculations, and data regarding parameters to be employed in calculations, such as adjusted weighting parameters, are recorded in a predetermined region of image files as data attached to final images. For example, the data may be recorded in a region defined by a manufacturer (MakerNote) within a tag region of an Exif file.

As described above, in the digital camera 1 of the present embodiment, the initiation timing of preliminary emission is set according to the position of a detected face. Therefore, even if a portion of the elements cannot receive reflected light during the preliminary emission period due to a high shutter speed, pixel signals suited for use in calculations can be obtained in the periphery of the face. Accordingly, the flash emission amount to be employed during main emission can be set to an appropriate value.

Note that the initiation timing of preliminary emission may be determined based on the position of the reference pattern which is utilized by the face detecting section 55 to detect movement, instead of the position of the facial pattern. That is, the detected pattern is not limited to faces, but may be the entire body of a person, a portion of the body of a person, or a subject other than a human.

Second Embodiment

Next, an embodiment in which the preliminary emission period is controlled based on distances to subjects will be described. Note that the structures and processes other than those related to control of the flash 4 are the same as those of the digital camera 1 of the first embodiment, and therefore, detailed descriptions thereof will be omitted. In the present embodiment, the distance measuring section 56 of the digital camera 1 functions as the main region determining means.

Figure 13:
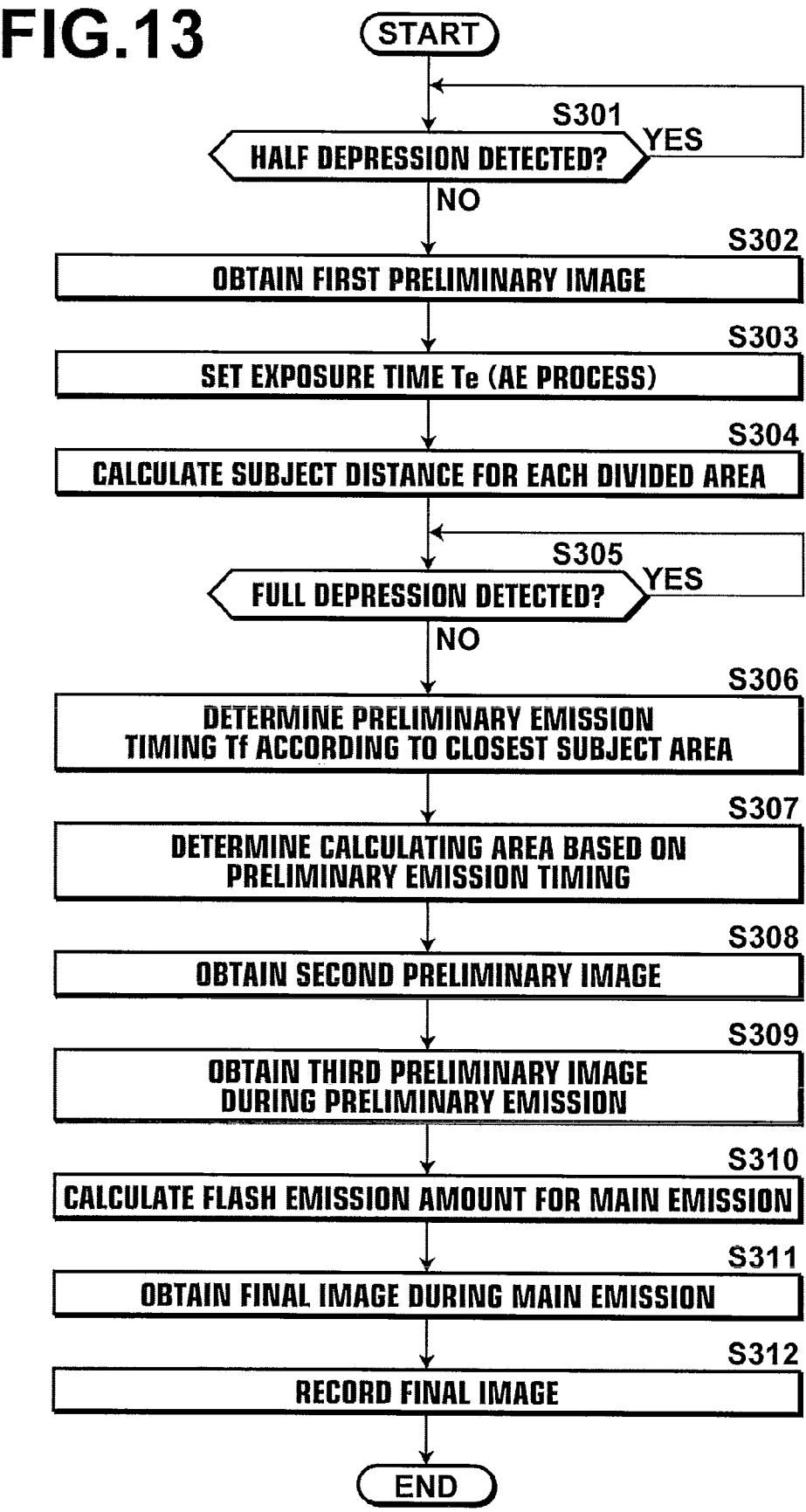
FIG. 13 is a flow chart that illustrates the operations of the digital camera of FIG. 1 related to determining a flash emission amount (second embodiment).

FIG. 13 is a flow chart that illustrates the steps of an operation to determine a flash emission amount to be employed during main emission by the digital camera 1 of the second embodiment. When a half depression operation of the shutter release button 3 is detected by the CPU 42 (step S301), a first preliminary image is obtained by commands issued by the CPU 42 and stored in the frame memory 49 (step S302). The first preliminary image is utilized by the AE/AWB processing 46 as described previously, and an exposure time Te is set by an AE process (step S303).

Figure 14:
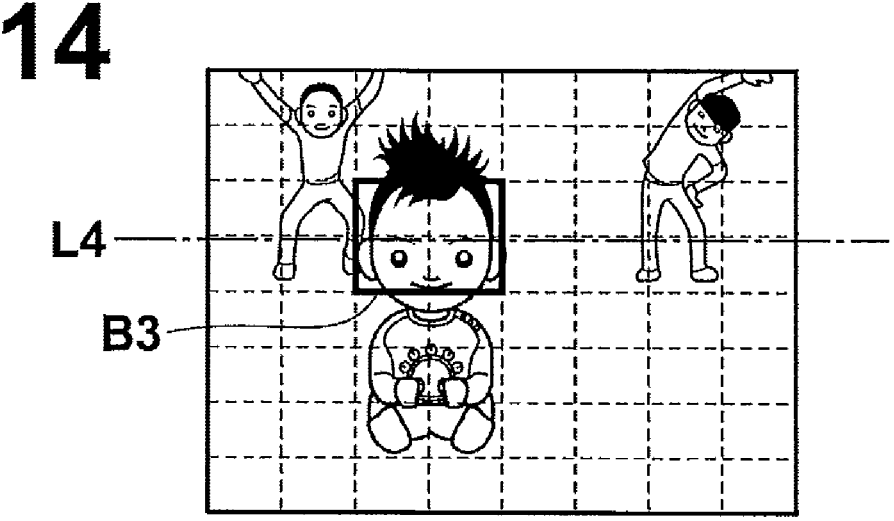
FIG. 14 is a diagram for explaining a method for determining a preliminary emission timing (second embodiment).

Meanwhile, the first preliminary image stored in the frame memory 49 is also read out by the distance measuring section 56. The distance measuring section 56 obtains distances to subjects for each block, and outputs main region data that indicates a block having the closest distance to a subject (step S304). FIG. 14 is a diagram that illustrates a block defined within an image by the process performed by the distance measuring section 56. Block group B3 surrounded by the bold frame indicates blocks which have been judged to have the shortest distances to the subject by the distance measuring section 56.

When the CPU 42 detects a full depression operation of the shutter release button 3 (step S305), the flash emission amount calculating section 53 obtains a line that includes the central pixel within the block group B3 indicated by the main region data. Thereafter, the amount of time between initiation of charge accumulation by unit elements of line 1 to the midpoint of a charge accumulation period of line L4 is calculated, based on the set exposure time Te and the output time To stored in the internal memory 48. Then, the calculated time is stored as time Tf that represents the initiation timing of preliminary emission in the internal memory 48. The preliminary emission period is set in this manner (step S306).

Further, the flash emission amount calculating section 53 determines a calculation area based on the set exposure time Te, the output time To stored in the internal memory 48, the time Tf that represents the initiation timing of preliminary emission, and the preliminary emission time Tp, by the same process as that of step S207 of the first embodiment (step S307). Thereafter, steps S308 through S312, which are the same as steps S208 through S212 of the first embodiment, are executed.

The digital camera 1 of the second embodiment sets the preliminary emission period according to the closest subject. Therefore, even if a portion of the elements cannot receive reflected light during the preliminary emission period due to a high shutter speed, pixel signals suited for use in calculations can be obtained regarding the closest subject. Accordingly, the flash emission amount to be employed during main emission can be set to an appropriate value.

Third Embodiment

Next, an embodiment in which the preliminary emission period is controlled based on the brightness of subjects will be described. Note that the structures and processes other than those related to control of the flash 4 are the same as those of the digital camera 1 of the first embodiment, and therefore, detailed descriptions thereof will be omitted. In the present embodiment, the AE/AWB processing section 47 of the digital camera 1 functions as the main region determining means.

Figure 15:
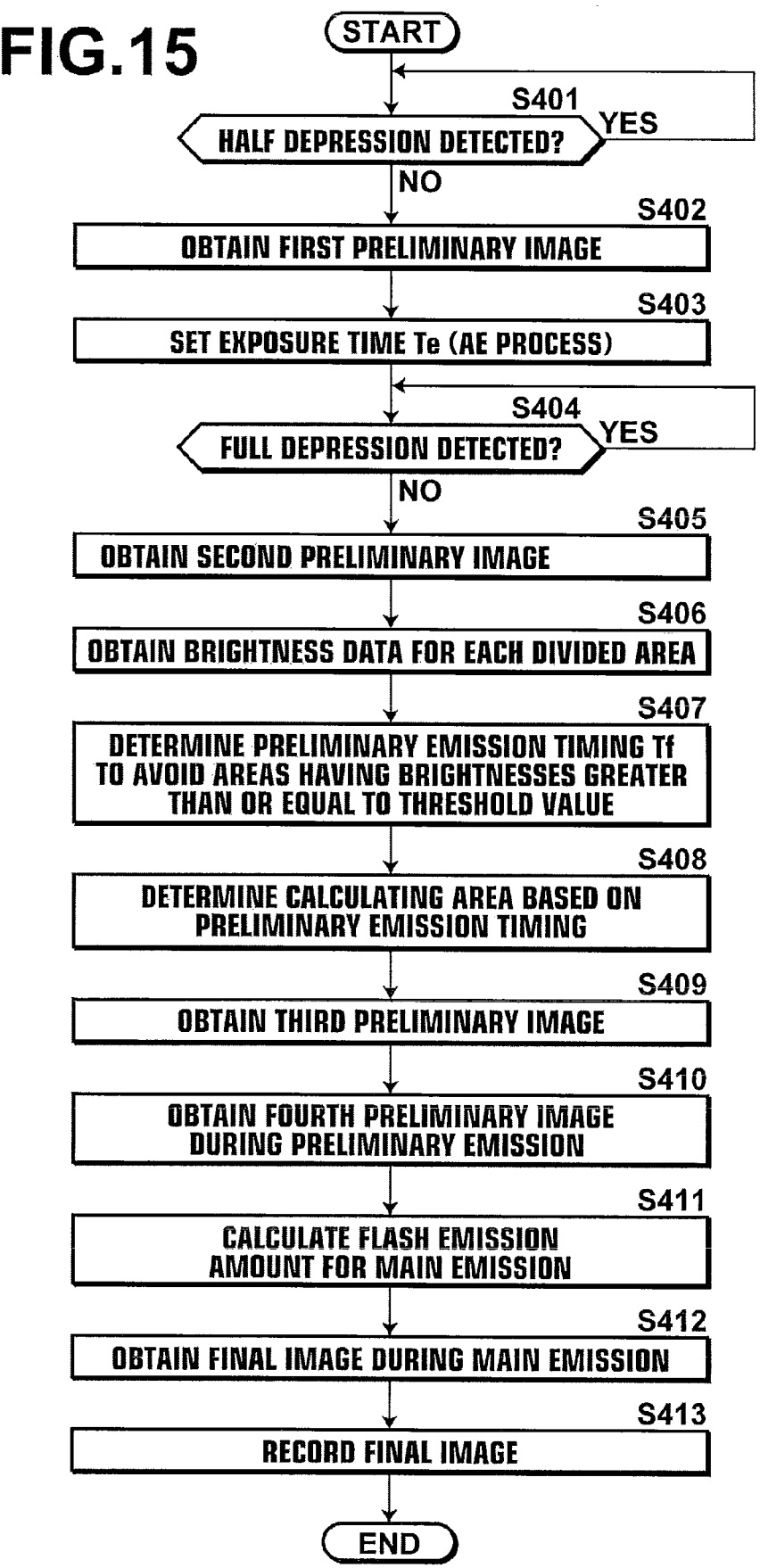
FIG. 15 is a flow chart that illustrates the operations of the digital camera of FIG. 1 related to determining a flash emission amount (third embodiment).

FIG. 15 is a flow chart that illustrates the steps of an operation to determine a flash emission amount to be employed during main emission by the digital camera 1 of the third embodiment. When a half depression operation of the shutter release button 3 is detected by the CPU 42 (step S401), a first preliminary image is obtained by commands issued by the CPU 42 and stored in the frame memory 49 (step S402). The first preliminary image is utilized by the AE/AWB processing 46 as described previously, and an exposure time Te is set by an AE process (step S403).

Figure 16:
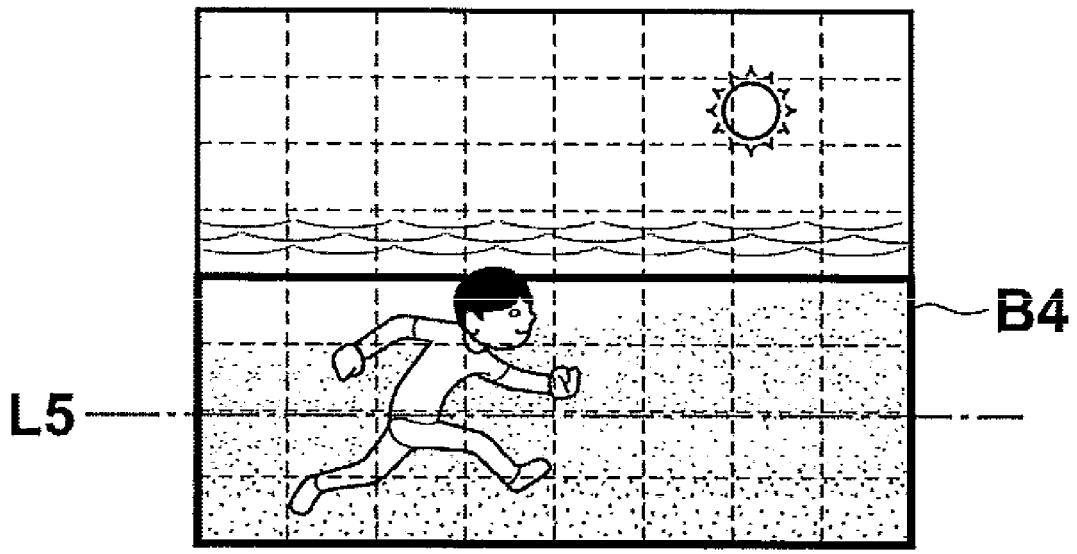
FIG. 16 is a diagram for explaining a method for determining a preliminary emission timing (third embodiment).

When the CPU 42 detects a full depression operation of the shutter release button 3 (step S404), a through the lens image at the point in time when the shutter release button 3 was fully depressed is obtained as a second preliminary image, and stored in the frame memory 49 (step S405). Here, the AE/AWB processing section 46 measures subject brightnesses within the second preliminary image, and obtains brightness data for each block within the image (step S406). Then, main region data that indicates one or a plurality of blocks having brightnesses less than a threshold value is output. FIG. 16 is a diagram that illustrates a block defined within an image by the process performed by the AE/AWB processing section. Block group B4 surrounded by the bold frame indicates blocks which have been judged to have brightnesses less than the threshold value.

The flash emission amount calculating section 53 obtains a line L5 that includes the central pixel within the blocks indicated by the main region data. Thereafter, the amount of time between initiation of charge accumulation by unit elements of line 1 to the midpoint of a charge accumulation period of line L5 is calculated, based on the set exposure time Te and the output time To stored in the internal memory 48. Then, the calculated time is stored as time Tf that represents the initiation timing of preliminary emission in the internal memory 48. The preliminary emission period is set in this manner (step S407).

Further, the flash emission amount calculating section 53 determines a calculation area based on the set exposure time Te, the output time To stored in the internal memory 48, the time Tf that represents the initiation timing of preliminary emission, and the preliminary emission time Tp, by the same process as that of step S207 of the first embodiment (step S408). Thereafter, steps S409 through S413, which are the same as steps S208 through S212 of the first embodiment, are executed.

The digital camera 1 of the third embodiment sets the timing of preliminary emission according to a region having a normal brightness, excluding particularly bright regions (such as overexposed portions and clear skies). Therefore, even if a portion of the elements cannot receive reflected light during the preliminary emission period due to a high shutter speed, pixel signals suited for use in calculations can be obtained regarding the main region. Accordingly, the flash emission amount to be employed during main emission can be set to an appropriate value.

Fourth Embodiment

Next, an embodiment in which the preliminary emission period is controlled based on image regions set by a user will be described. Note that the structures and processes other than those related to control of the flash 4 are the same as those of the digital camera 1 of the first embodiment, and therefore, detailed descriptions thereof will be omitted. In the present embodiment, the image processing section 47 of the digital camera 1 functions as the main region determining means.

Figure 17:
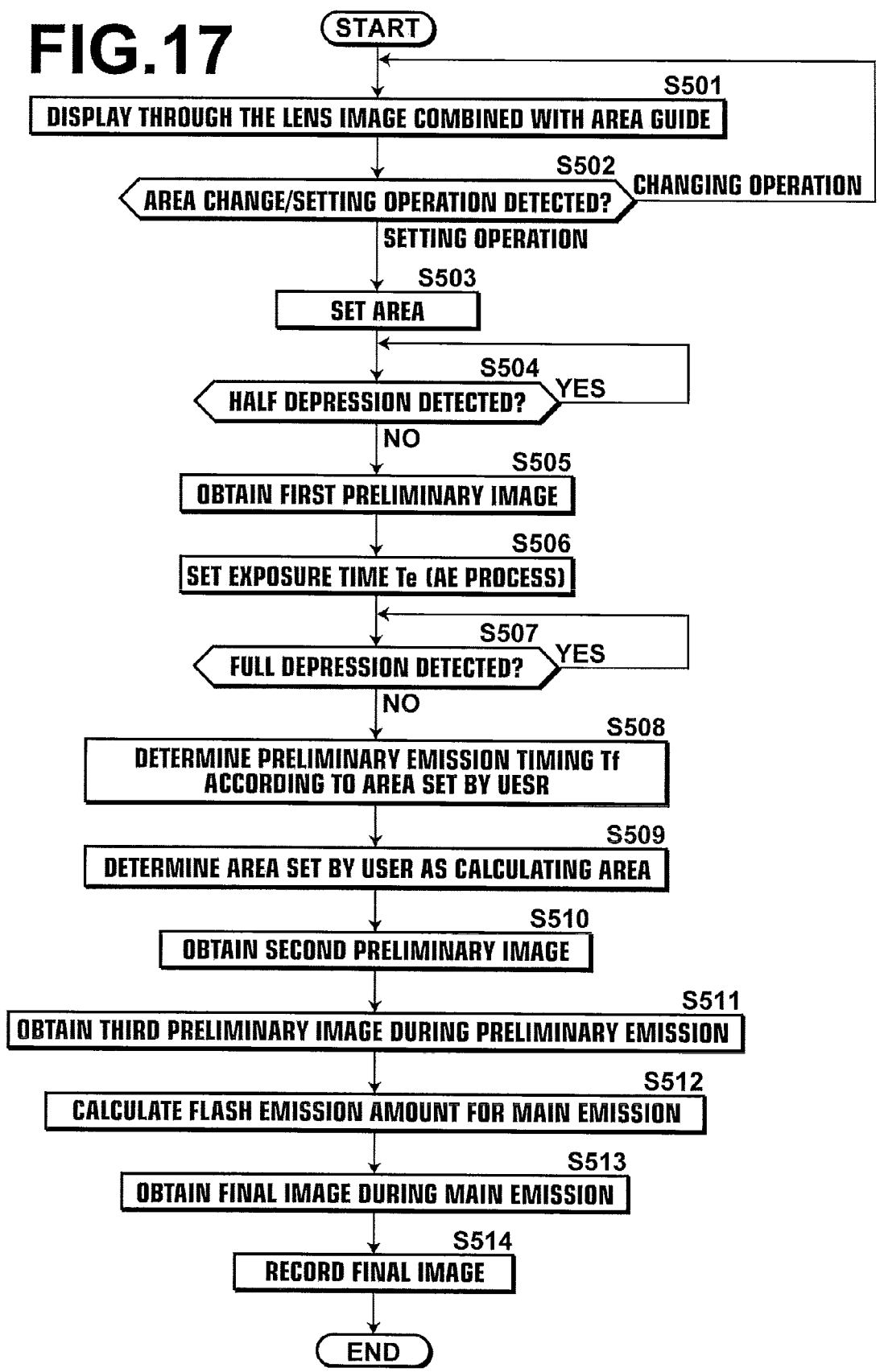
FIG. 17 is a flowchart that illustrates the operations of the digital camera of FIG. 1 related to determining a flash emission amount (fourth embodiment).
Figure 18:
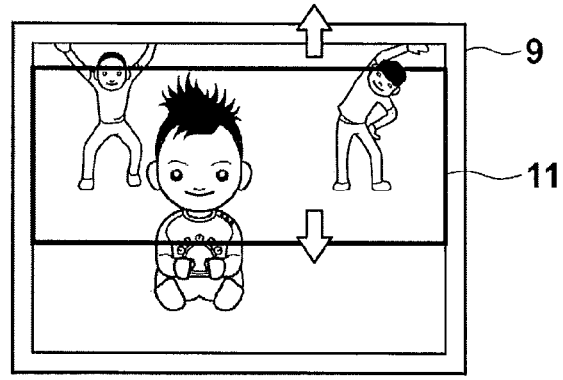
FIG. 18 is a diagram that illustrates an example of an area guide display.

FIG. 17 is a flow chart that illustrates the steps of an operation to determine a flash emission amount to be employed during main emission by the digital camera 1 of the fourth embodiment. The digital camera 1 sequentially stores images obtained by the imaging system 30 in the frame memory 49 temporarily prior to operation of the shutter release button 3, and displays the images as through the lens images on the monitor 9 via the display control section 50. During this time, the image processing section 47 reads out the images stored in the frame memory 49, combines images of frames (hereinafter, referred to as "area guides") that function as markers to indicate main regions within the images with the images, and updates the images in the frame memory 49 with the combined images. Thereby, images which are combined with the area guides 11 are displayed on the monitor 9 as through the lens images, as illustrated in FIG. 18 (step S501).

A user changes the region indicated by the area guide 11, by moving, enlarging, or reducing the area guide 11, and performs predetermined confirmation operations, to set a desired region. When area changing operations are detected by the CPU 42 (step S502), the image processing section 47 recombines the through the lens image and the image of the area guide 11. When the CPU 42 detects an area setting (confirming) operation (step S502), the image processing section 47 stores data that indicates the set region within the internal memory 48. Thereby, the area specified by the user is set as a main region (step S503).

Thereafter, when a half depression operation of the shutter release button 3 is detected by the CPU 42 (step S504), a first preliminary image is obtained by commands issued by the CPU 42 and stored in the frame memory 49 (step S505). The first preliminary image is utilized by the AE/AWB processing 46 as described previously, and an exposure time Te is set by an AE process (step S506).

Figure 19A:
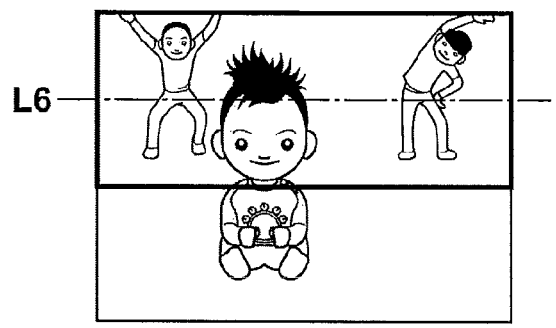
FIG. 19A is a diagram for explaining a method for determining a preliminary emission timing (fourth embodiment)
Figure 19B:
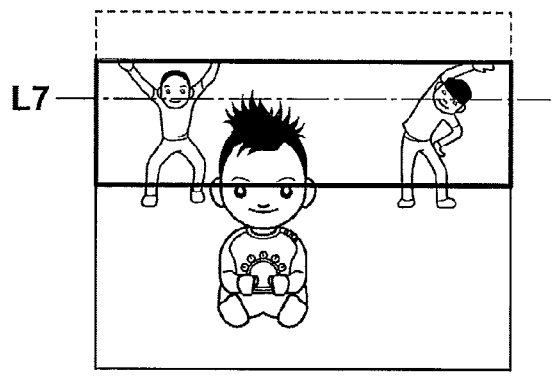
FIG. 19B is a diagram for explaining a method for determining a preliminary emission timing (fourth embodiment)

When the CPU 42 detects a full depression operation of the shutter release button 3 (step S507), the flash emission amount calculating section 53 obtains a line L6 or a line L7 that includes the central pixel within the area set by the user operations, as illustrated in FIG. 19A and FIG. 19B. Thereafter, the amount of time between initiation of charge accumulation by unit elements of line 1 to the midpoint of a charge accumulation period of line L6 or line L7 is calculated, based on the set exposure time Te and the output time To stored in the internal memory 48. Then, the calculated time is stored as time Tf that represents the initiation timing of preliminary emission in the internal memory 48. The preliminary emission period is set in this manner (step S508).

Further, the flash emission amount calculating section 53 determines lines to be utilized in calculations (calculation area) based on the set exposure time Te, the output time To stored in the internal memory 48, the time Tf that represents the initiation timing of preliminary emission, and the preliminary emission time Tp (step S509). In the case that the area illustrated in FIG. 19A is set, the determination of the calculation area is performed by the same process as that of step S207 of the first embodiment. In the case that an area that exceeds the range of the image is set as illustrated in FIG. 19B, a range from the upper edge of the image to the lower edge of the set area is determined to be the calculation area. Thereafter, steps S510 through S514, which are the same as steps S208 through S212 of the first embodiment, are executed.

The digital camera 1 of the fourth embodiment sets the timing of preliminary emission according to an area set by a user. Therefore, even if a portion of the elements cannot receive reflected light during the preliminary emission period due to a high shutter speed, pixel signals suited for use in calculations can be obtained regarding a subject important to the user. Accordingly, the flash emission amount to be employed during main emission can be set to an appropriate value. For example in the images illustrated in FIG. 19A and FIG. 19B, generally, digital cameras perform control of flash with the person in the foreground of the image as a main subject. However, the digital camera of the present embodiment is capable of controlling the flash with the person in the background of the image as a main subject, if the user desires. That is, user intentions can be reflected in the control of flash.

Note that in the case that an area that exceeds the range of the image is set, as illustrated in FIG. 19B, if the preliminary emission period is determined based on the main region set by the user, there are cases that the preliminary flash period shifts greatly from a standard preliminary emission period (reference period). Here, the reference period is a period having the midpoint of a period beginning at a charge accumulation initiation time of line 1 and a charge accumulation completion time of line N as the preliminary emission initiation timing. If the preliminary emission period shifts greatly from the reference period, the number of lines that can be utilized for calculations decreases, and there is a possibility that problems will occur in the calculations.

Accordingly, it is desirable for preliminary emission periods determined based on areas specified by users to be adjusted and reset, in cases that temporal shifts between the preliminary emission periods and the reference period exceed a predetermined threshold value.

Figure 20A:
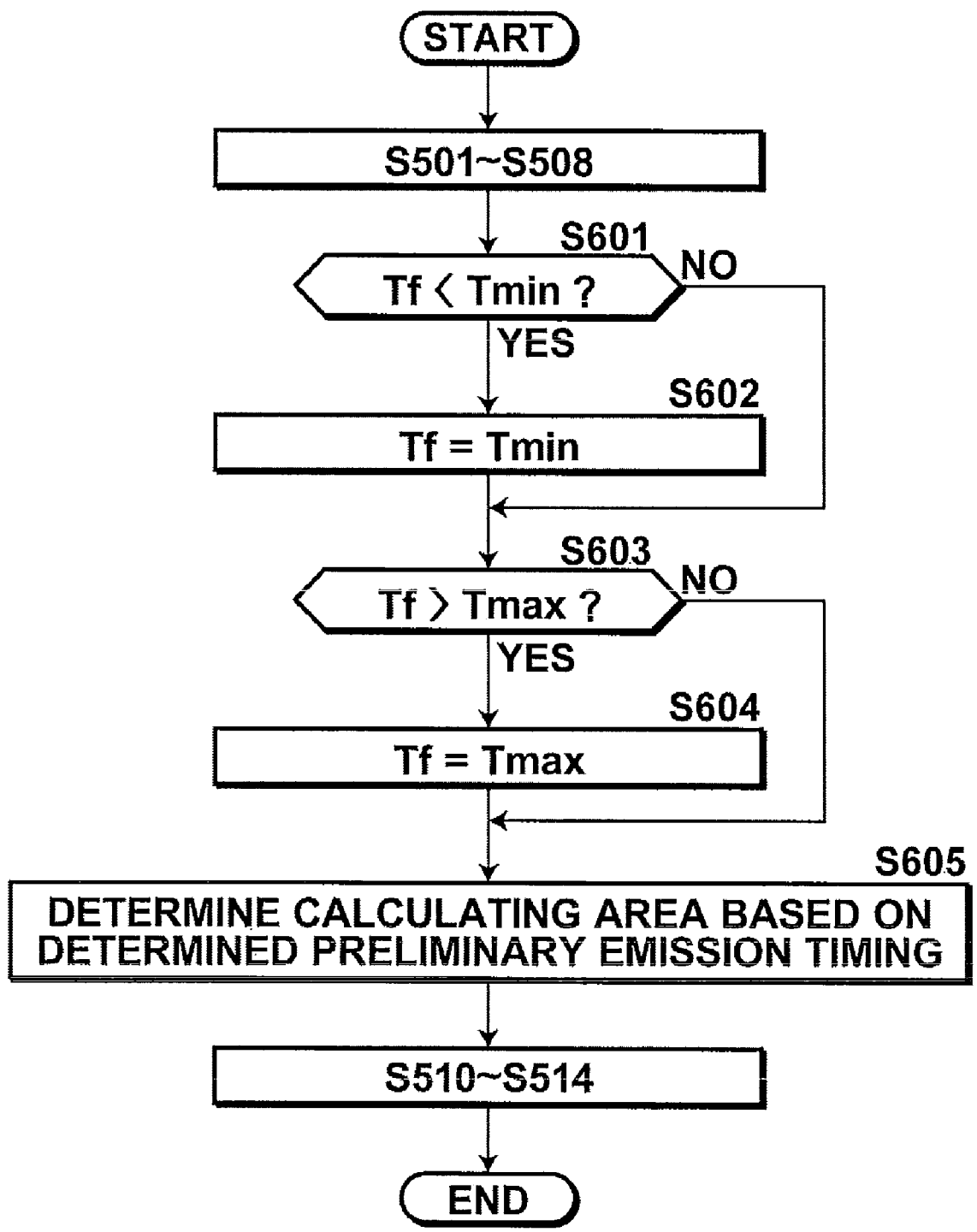
FIG. 20A is a flow chart that illustrates the steps of a process which is a modification of the operations of FIG. 17.
Figure 20B:
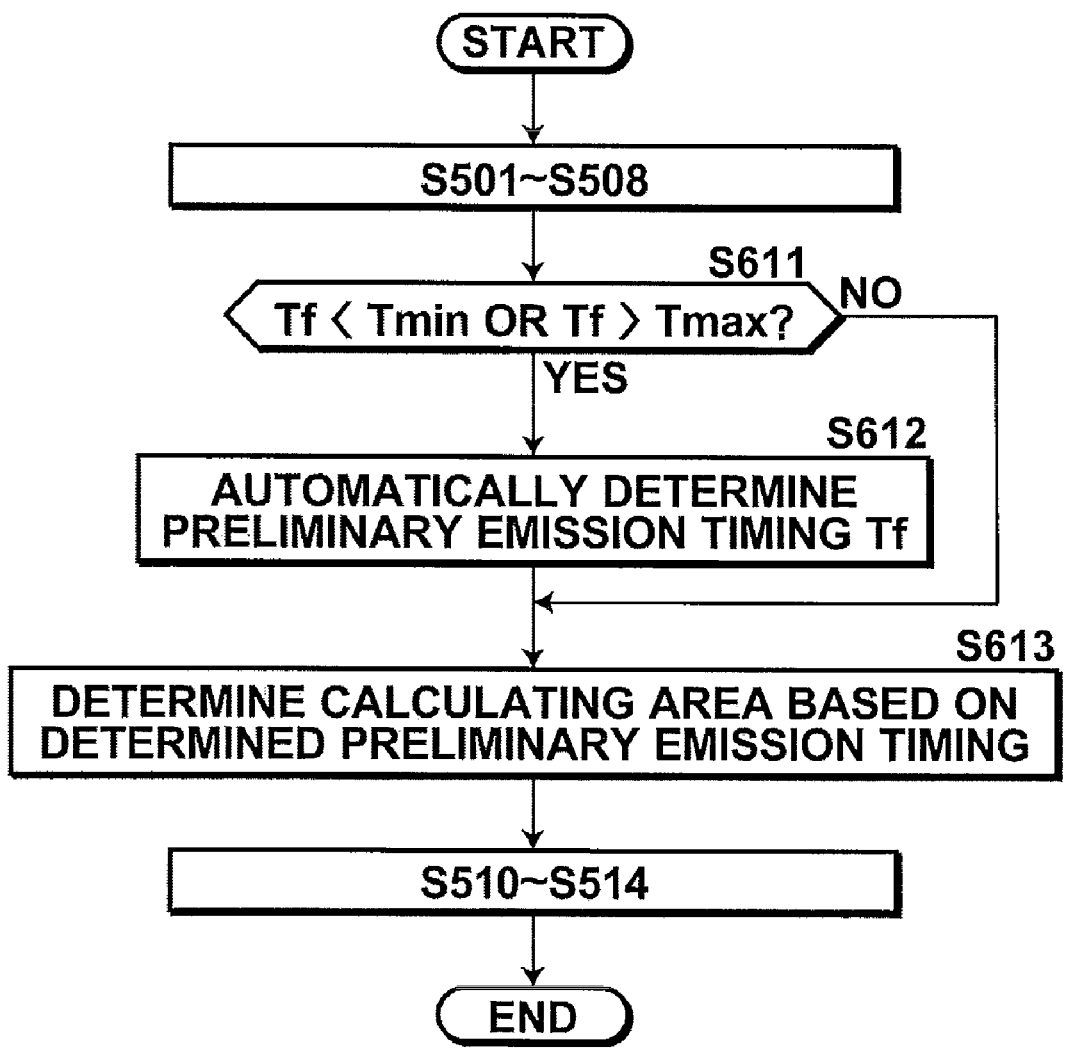
FIG. 20B is a flow chart that illustrates the steps of a process which is another modification of the operations of FIG. 17.

FIG. 20A and FIG. 20B illustrate processes for adjusting preliminary emission periods in cases that the preliminary emission period set in step S508 is shifted greatly from the reference period, having the midpoint of a period beginning at a charge accumulation initiation time of line 1 and a charge accumulation completion time of line N as the preliminary emission initiation timing.

FIG. 20A illustrates a process by which the period preliminary emission period is reset such that a period which is shifted for an amount of time corresponding to a predetermined threshold value from a reference period becomes the preliminary emission period. Tmin is a threshold value which is set in advance by subtracting an allowable amount of temporal shift from a time that represents the midpoint. Tmax is a threshold value which is set in advance by adding an allowable amount of temporal shift from a time that represents the midpoint.

In the process illustrated in FIG. 20A, the flash emission amount calculating section 53 compares the time Tf determined at step S508 against the threshold value Tmin (step S601), and if Tf is less than the threshold value Tmin, replaces the value of Tf stored in the internal memory 48 with Tmin (step S602). In the case that Tf is greater than the threshold value Tmin, Tf is compared against the threshold value Tmax (step S603). If Tf is greater than the threshold value Tmax, replaces the value of Tf stored in the internal memory 48 with Tmax (step S604). Then, the processes of steps S601 through S604 are executed instead of the process of step S509, and a calculation area is determined based on a preliminary emission initiation timing which is ultimately determined (step S605).

FIG. 20B illustrates a process in which the preliminary emission period is reset to the reference period. In the process illustrated in FIG. 20B, the time Tf determined at step S508 is compared against the threshold values Tmin and Tmax (step S611). If Tf is less than the threshold value Tmin or greater than the threshold value Tmax, the initiation timing of preliminary emission is set to the midpoint of a period beginning at a charge accumulation initiation time of line 1 and a charge accumulation completion time of line N, regardless of the are set by the user operations (step S612). Thereafter, a calculation area is determined based on the determined preliminary emission timing (step S613).

In the embodiments illustrated in FIG. 20A and FIG. 20B, the timing of preliminary emission is reset in cases that the preliminary emission period set to reflect user intentions is shifted greatly from a standard period, and there is a possibility that problems will occur in the calculations of the flash emission amount. Therefore, appropriate control can be performed, even in case that users specify inappropriate areas.

Other Embodiments

In the first through fourth embodiments described above, the face detecting section 55, the distance measuring section 56, the AE/AWB processing section 46 and the image processing section 47 function as the main region determining means, respectively. Alternatively, all of the face detecting section 55, the distance measuring section 56, the AE/AWB processing section 46 and the image processing section 47 may perform processes to determine the main region, and the flash emission amount calculating section 53 may select a main region from among those represented by main region data output by each processing section according to a photography mode setting or a flash mode setting. Further, whether setting of preliminary emission timing is to be performed may be defined for each photography mode or each flash mode, and the flash emission amount calculating section 53 may refer to the mode setting and perform adjustment of the preliminary emission period only when necessary.

In addition, area guides similar to the area guide 11 of the fourth embodiment may also be displayed on the monitor 9 in the first through third embodiments. In the first through third embodiments, users cannot set areas, but by enabling users to confirm which areas are set as calculation areas, the users can be provided with opportunities to perform photography operations again.

Note that methods for extracting pixel signals to be utilized in calculations, formulas for calculating flash emission amounts, parameters which are utilized in the calculations, and contents of display by the monitor other than those exemplified in the present specification are possible. Such modifications are also within the technical scope of the present invention.

What is claimed is:

1. An imaging apparatus, comprising:
an image sensor constituted by a plurality of photoelectric converting elements which are arranged in a matrix and capable of being accessed randomly;
control means for controlling the charge accumulation initiation timing and the charge accumulation cessation timing of the photoelectric converting elements line by line or pixel by pixel;
image forming means for forming images employing pixel signals which are output from the photoelectric converting elements;
main region determining means for determining portions of the images which are formed by the image forming means as main regions;
flash driving means for driving a flash during a set preliminary emission period and a set main emission period; and
period setting means for setting the preliminary emission period such that charge accumulation is initiated prior to the preliminary emission period and charge accumulation is ceased after the preliminary emission period in the photoelectric converting elements corresponding to pixels that constitute the determined main portions,
wherein the period setting means resets the preliminary emission period such that a period which is shifted for an amount of time corresponding to a predetermined threshold value from a reference period becomes the preliminary emission period, in the case that the amount of temporal shift between the preliminary emission period, which has been set based on the main region, and the reference period exceeds the predetermined threshold value.

2. An imaging apparatus as defined in claim 1, wherein:
the main region determining means detects predetermined patterns within the images formed by the image forming means, and determines regions in which the predetermined patterns are present as the main regions.

3. An imaging apparatus as defined in claim 2, wherein:
the predetermined patterns are images of faces.

4. An imaging apparatus as defined in claim 2, wherein:
the predetermined patterns are reference patterns which are utilized to detect movement of subjects.

5. An imaging apparatus as defined in claim 1, wherein:
the main region determining means divides the images formed by the image forming means into a plurality of blocks, calculates distances from each block to subjects within the images, and determines regions constituted by at least one block having a distance to the subjects less than or equal to a predetermined threshold value as the main regions.

6. An imaging apparatus as defined in claim 1, wherein:
the main region determining means divides the images formed by the image forming means into a plurality of blocks, calculates the brightness of subjects within each block, and determines regions constituted by at least one block having a subject brightness less than or equal to a predetermined threshold value as the main regions.

7. An imaging apparatus as defined in claim 1, wherein:
the main region determining means receives input of region setting operations by a user within the images formed by the image forming means, and determines regions set by the region setting operations as the main regions.

8. An imaging apparatus as defined in claim 1, further comprising:
display control means for outputting the images formed by the image forming means and markers that indicate the main regions determined by the main region determining means to a predetermined screen.

9. An imaging apparatus as defined in claim 1, wherein:
the main region determining means operates selectively based on an operating mode set in the imaging apparatus.

10. An imaging apparatus as defined in claim 1, further comprising:
means for recording the images formed by the image forming means into a predetermined recording medium, and for recording data that specifies the preliminary emission period as data attached to the images.

11. A method for controlling flash emission of an imaging apparatus that has a flash photography function, comprising the steps of:
controlling the charge accumulation initiation timing and the charge accumulation cessation timing of photoelectric converting elements of an image sensor constituted by a plurality of photoelectric converting elements which are arranged in a matrix and capable of being accessed randomly line by line or pixel by pixel;
forming images employing pixel signals which are output from the photoelectric converting elements;
determining portions of the formed images as main regions;
setting a preliminary emission period such that charge accumulation is initiated prior to the preliminary emission period and charge accumulation is ceased after the preliminary emission period in the photoelectric converting elements corresponding to pixels that constitute the determined main portions;
resetting the preliminary emission period such that a period which is shifted for an amount of time corresponding to a predetermined threshold value from a reference period becomes the preliminary emission period, in the case that the amount of temporal shift between the preliminary emission period, which has been set based on the main region, and the reference period exceeds the predetermined threshold value; and
driving a flash during the set preliminary emission period.

12. An imaging apparatus, comprising:
an image sensor constituted by a plurality of photoelectric converting elements which are arranged in a matrix and capable of being accessed randomly;
control means for controlling the charge accumulation initiation timing and the charge accumulation cessation timing of the photoelectric converting elements line by line or pixel by pixel;
image forming means for forming images employing pixel signals which are output from the photoelectric converting elements;
main region determining means for determining portions of the images which are formed by the image forming means as main regions;
flash driving means for driving a flash during a set preliminary emission period and a set main emission period; and
period setting means for setting the preliminary emission period such that charge accumulation is initiated prior to the preliminary emission period and charge accumulation is ceased after the preliminary emission period in the photoelectric converting elements corresponding to pixels that constitute the determined main portions,
wherein the period setting means resets the preliminary emission period such that a reference period becomes the preliminary emission period, in the case that the amount of temporal shift between the preliminary emission period, which has been set based on the main region, and the reference period exceeds a predetermined threshold value.

13. An imaging apparatus as defined in claim 12, wherein:
the main region determining means detects predetermined patterns within the images formed by the image forming means, and determines regions in which the predetermined patterns are present as the main regions.

14. An imaging apparatus as defined in claim 13, wherein:
the predetermined patterns are images of faces.

15. An imaging apparatus as defined in claim 13, wherein:
the predetermined patterns are reference patterns which are utilized to detect movement of subjects.

16. An imaging apparatus as defined in claim 12, wherein:
the main region determining means divides the images formed by the image forming means into a plurality of blocks, calculates distances from each block to subjects within the images, and determines regions constituted by at least one block having a distance to the subjects less than or equal to a predetermined threshold value as the main regions.

17. An imaging apparatus as defined in claim 12, wherein:
the main region determining means divides the images formed by the image forming means into a plurality of blocks, calculates the brightness of subjects within each block, and determines regions constituted by at least one block having a subject brightness less than or equal to a predetermined threshold value as the main regions.

18. An imaging apparatus as defined in claim 12, wherein:
the main region determining means receives input of region setting operations by a user within the images formed by the image forming means, and determines regions set by the region setting operations as the main regions.

19. An imaging apparatus as defined in claim 12, further comprising:
display control means for outputting the images formed by the image forming means and markers that indicate the main regions determined by the main region determining means to a predetermined screen.

20. An imaging apparatus as defined in claim 12, wherein:
the main region determining means operates selectively based on an operating mode set in the imaging apparatus.

21. An imaging apparatus as defined in claim 12, further comprising:
means for recording the images formed by the image forming means into a predetermined recording medium, and for recording data that specifies the preliminary emission period as data attached to the images.

22. A method for controlling flash emission of an imaging apparatus that has a flash photography function, comprising the steps of:
controlling the charge accumulation initiation timing and the charge accumulation cessation timing of photoelectric converting elements of an image sensor constituted by a plurality of photoelectric converting elements which are arranged in a matrix and capable of being accessed randomly line by line or pixel by pixel;
forming images employing pixel signals which are output from the photoelectric converting elements;
determining portions of the formed images as main regions;

setting a preliminary emission period such that charge accumulation is initiated prior to the preliminary emission period and charge accumulation is ceased after the preliminary emission period in the photoelectric converting elements corresponding to pixels that constitute the determined main portions;

resetting the preliminary emission period such that a reference period becomes the preliminary emission period, in the case that the amount of temporal shift between the preliminary emission period, which has been set based on the main region, and the reference period exceeds a predetermined threshold value; and driving a flash during the set preliminary emission period.

* * * * *